United States Patent [19]
Carmellini et al.

[11] 3,791,841
[45] Feb. 12, 1974

[54] LOW TEMPERATURE DECALCOMANIA

[75] Inventors: Andrew E. Carmellini, Brookfield, Conn.; Andrew J. Rogers, Bronx, N.Y.

[73] Assignee: Commercial Decal, Inc., Mt. Vernon, N.Y.

[22] Filed: Aug. 10, 1972

[21] Appl. No.: 279,473

Related U.S. Application Data

[63] Continuation-in-part of Ser. No. 145,630, May 21, 1971, abandoned.

[52] U.S. Cl. .................................. 117/3.4, 117/3.6
[51] Int. Cl. ............................................... B41m 3/12
[58] Field of Search ...... 117/3.1, 3.6; 156/230, 235, 156/240, 89; 161/406 T

[56] References Cited
UNITED STATES PATENTS

| | | |
|---|---|---|
| 2,746,877 | 5/1956 | Matthes .............................. 117/3.1 |
| 2,351,933 | 6/1944 | Decker et al. ..................... 117/3.1 X |
| 2,941,916 | 6/1960 | Akkeron ............................ 117/3.6 X |
| 3,632,365 | 1/1972 | Gray ..................................... 117/3.4 |
| 3,006,891 | 10/1961 | Nikles et al. ....................... 260/47 EP |
| 3,271,363 | 9/1966 | Nikles ............................... 260/47 EP |

Primary Examiner—William D. Martin
Assistant Examiner—Harry J. Gwinnell
Attorney, Agent, or Firm—David Lerner

[57] ABSTRACT

There is provided herewith a decalcomania which is designed for application to a ware and which becomes adherent to the surface thereof by firing at low temperatures. The decal includes a lacquer layer and an opaque layer, each comprising a thermosetting epoxy resin in a solvent therefor and containing combined therewith a cross-linking agent.

25 Claims, 2 Drawing Figures

PATENTED FEB 12 1974 3,791,841

Inventors:
Andrew S. Carmellini
Andrew J. Rogers

By: March and LeFever
Attorneys:

LOW TEMPERATURE DECALCOMANIA

This application is a continuation-in-part of U.S. application Ser. No. 145,630, filed May 21, 1971, now abandoned.

BACKGROUND OF INVENTION

The invention relates to decalcomanias hereinafter sometimes referred to as "decals."

Particularly, the invention relates to decals which are affixed to objects to be decorated, which objects are not susceptible to the normally high temperature affixing operation usually associated with ceramic decals.

The use of decalcomanias to decorate objects has long been known to the art. Of particular interest has been the use of decals to decorate ceramic objects such as pottery, dishes, etc. These ceramic decalcomanias have been applied in various manners among which may be mentioned the process of applying a decal to the bisque, or unglazed ceramic ware, after which a coating of glaze material is applied over the decal and the ceramic object fired at elevated temperatures to permanently affix the decoration to the ware. This technique, known as "underglaze decoration," requires a firing at temperatures in the neighborhood of 2,000° F. to 2,200° F.

Another technique for decorating involves coating the bisque with a glaze coat, firing the coated ware to set the glaze, application of the decal decoration, and refiring to affix the decal to the glazed object. In this instance, known as "overglaze decoration," the decal is designed so as to result, after the firing step, in a decoration containing its own protective coating thereover, usually by virtue of a ceramic flux in the design coat which forms an impervious layer of a glass or ceramic-like material during firing. This firing operation normally occurs at temperatures within the range of 1,050° F. to 1,470° F.

Recently the art has developed ware wherein the coating materials used are not the previously known ceramic coatings wherein the ceramic materials are fused to a brittle, but highly impervious glaze-like layer. Recently developed coatings include high melting point polymeric materials such as polyamide coatings, polyacrylic coatings and the like. These polymeric or plastic-like coatings are becoming increasing popular due to the ease of their application, the short cure time required to process, the economy recognized through lower material costs, because of lack of chipping or separation, etc.

However, the prior art decalcomanias may not be used with ware covered with the new polymeric coatings since the temperatures required to affix prior art ceramic-type decals are to high for use with the plastic or polymeric coated materials normally selected.

The prior art discloses decalcomanias which include resinous film-forming ingredients. For example, U.S. Pat. No. 2,746,877 to Matthes, assigned to the Meyercord Co. discloses decals of the dry strip or heat release type which may be manufactured by gravure printing and include a temporary carrier, a dry release coating on the carrier, a stripping layer on the release coating, the stripping layer comprising a resinous film-forming ingredient readily separable by dry release from the coating, and a composite design layer or imprint which is made up of a plurality of superimposed lacquer or ink films. The inventive feature of the Matthes decal is that the lacquer or ink used in forming each of the films comprising the composite design contains a different resinous film-forming ingredient and a different selective solvent. The solvent for each successive layer is selected so as to have no adverse solvent or softening effect on the resinous film-forming ingredient of the preceding or underlying layer. The resinous film-forming materials disclosed include cellulose esters and ethers as well as vinyl or acrylic resins, such as cellulose acetate, nitrocelluose, and ethyl celluose.

U.S. Pat. No. 2,942,916 to Akkeron, assigned to The Meyercord Co., discloses a heat resistant decal which includes silicone or organosiloxane resins as the principal ingredient. The decal generally includes a backing with a release surface and a thin laminar transfer unit which includes a clear unpigmented continuous film of organosiloxane resin which functions as a base or support for the transfer unit. Superimposed over the base or support film is a pigmented or background layer and superimposed over the background layer is a compound layer which includes the design work. Each of these layers consists principally of heat resistant uncured organosiloxane resins which adhere together to provide a unitary transfer body.

U.S. Pat. No. 3,632,365 to Gray, assigned to Owens-Illinois, Inc., discloses a decal comprising a pyrolyzable decorative heat curable organic film base containing a decorative heat curable organic film base or coating. The pyrolyzable film base is a copolymer, terpolymer, or quadpolymer of oxygen and a monomer which can be an alkyl methacrylate, styrene or alpha alkyl styrene. The heat curable organic base decorative composition, which is applied decorative composition, which is applied to one surface of the pyrolyzable base, is preferably a thermosetting organic resin base such as an epoxy resin.

U.S. Pat. No. 2,351,933 to Decker, et al. discloses a method and means for transferring printed matter from a removable backing to glass or other surfaces. In one embodiment, a design in the form of colored ink is printed upon a background layer formed of a contrasting color. The background layer and design layers are enclosed by lacquer layers. The design in effect comprises laminations of lacquer-like material having enclosed therebetween a pigmented layer.

None of the above-mentioned patents deal with the problem of forming a permanent decoration on a ware having a plastic coating.

The present invention relates to novel decalcomanias which are useful for decorating objects such as glass, metal and the like which are uncoated or which are coated with the above-mentioned polymeric coating materials.

The decal of the invention may be satisfactorily affixed to such objects without the use of high temperature treatment and so such represent a step forward in the decal art.

BRIEF STATEMENT OF THE INVENTION

There is provided herewith a novel decalcomania which may be affixed to ware such as glass, other siliceous substrates, aluminium, polymeric coated glass or metal, and the like at a low temperature heat treatment and yet with a degree of permanence hitherto unknown.

The decals of this invention are based on the discovery that a particular combination of polymeric materials may be incorporated into the decal design such that there results a permanent decoration after a heat treating operation which does not affect the polymeric coating of the ware.

Briefly, the inventive concept relates to the discovery that a thermosetting resin such as a high molecular weight linear epoxy resin material may be combined with a catalytic amount of a cross-linking agent to result in a composition which becomes satisfactorily affixed to the surface of the ware after a simple low temperature affixing operation employing temperatures ranging from about 250° to about 400° F.

DETAILED DESCRIPTION OF THE INVENTION

Figure 1:
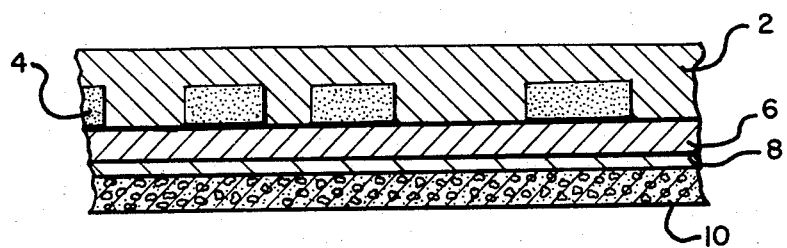

The decal of this invention comprises essentially three different layers and the requisite supporting layer or substrate. These three essential layers include a lacquer layer, a design layer, and an opaque background layer, reading from the outside in when the decal is applied to the ware.

It has been found and forms the object of this invention, that when the lacquer layer and the opaque background layer comprises a particular combination of a high molecular weight linear epoxy resin and a minor, but catlytic amount of a cross-linking agent, such as a melamine resin, the decalcomania may be quickly and easily affixed to the surface of an article via a low temperature firing operation, the temperature being sufficiently low as to not affect a polymeric coating of the ware, if so coated.

In the design of the decal of this invention, it has been found that an opaque background layer upon which a design layer is printed, gives optimum fidelity and clarity for the resulting decoration. This background, or printing layer, is normally directly deposited by coating or printing techniques known to the art on the substrate for the decal.

This substrate may be either a water releasable or heat releasable substrate with which the art is familiar. For example, in a water releasable substrate there is deposited upon the usual decalcomania backing paper a thin layer or coating of a material which is either water soluble or which becomes softened in the presence of water. Such a coating is known to the art and may be a composition containing a water soluble gum such as dextrins, polyvinyl alcohols, starch or the like.

After the water soluble coating material is applied to the backing paper the opaque background layer is deposited thereon by any conventional printing technique such as silk screening, lithography, or the like.

Decalcomanias wherein the essential layers may be removed from the substrate by elevating the temperature thereof are becoming increasingly popular in the art. For this type of decal, commonly known as a "heat release" decal, there is deposited on the backing paper a coating or a thin layer of a material which becomes liquid at low temperatures. Such materials include polyethylene glycols having molecular weights of from about 200 to 20,000, low melting point waxes and the like.

In applying a "slide-off" decalcomania to ware to be decorated, the total decal is moistened with water and the functional layers thereof are simply slid laterally from its substrate to the ware to be decorated. Thus, the background or printing layer is placed next to the ware coat, the design layer and the lacquer layer being superimposed thereon.

In the heat release type of decal the ware is normally raised to the heat release temperature, the decal applied thereto with the paper backing upward, that is away from the surface of the ware, and the substrate removed therefrom. Thus, the order of the printing layer, design layer and lacquer layer are reversed in these two types of decal.

Figure 2:
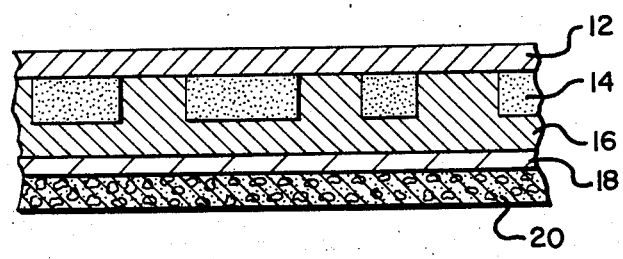

This feature is illustrated more particularly in the accompanying drawings in which FIG. 1 represents a cross-sectional view of a typical "slide-off" type of decal; and FIG. 2 represents a cross-sectional view of a typical design for a heat release type of decal.

Turning now to the drawings, with particular reference to FIG. 1, reference numeral 2 indicates a lacquer layer. This layer is superimposed on a design layer shown at 4. Reference numeral 6 indicates the opaque backing layer or contrast layer. Reference numeral 8 indicates a coating or layer of a water soluble material and reference numeral 10, the paper backing or support for the decal.

In the embodiment described in FIG. 1, layers 8 and 10 may be considered to be the substrate of the decal, whereas layers 2, 4, and 6 are the essential layers. When this decal is transferred to the ware, it is viewed as from the top of FIG. 1.

Turning now to FIG. 2, reference numeral 12 indicates the contrast layer or printing layer, reference numeral 14 designates the design layer and reference numeral 16, the lacquer layer. The coating or layer of a low melting point material is designated as 18 and with the paper support 20 comprises the substrate for this heat release decalcomania.

On application of the design shown in FIG. 2, layer 12 is applied next to the ware coating and, when the proper temperature is reached, layers 18 and 20 are easily and quickly removed therefrom.

As was stated generally above, the essence of this invention lies in the formulation of the lacquer layer and the contrast or opaque backing layer as will be described in more detail below.

Turning now to the compositions of the lacquer layer, and the opaque background layer, it has been found that one particularly desirable material is a mixture of from about 95% to about 70% by weight of a high molecular weight linear epoxy resin combined with from about 5% to about 30% by weight of a cross-linking material which results in a decal which may be adapted either to the "slide-off" or heat release design.

In a preferred embodiment of the invention, the lacquer layer and optionally the opaque background layer will also include an epoxy plasticizer in an amount within the range of from about 3% to about 16% by weight and preferably from about 8% to about 15% by weight, an adhesion promoter in an amount within the range from about 0.1% to about 3% by weight and preferably from about 0.2% to about 0.5% by weight and/or a leveling or flow control agent in an amount within the range of from about 0.01% to about 0.3% by weight and preferably from about 0.05% to about 0.2% by weight.

The epoxy polymer is a polyhydroxy epoxy resin having a molecular weight within the range of from about 15,000 to about 300,000 or more. One particularly useful epoxy polymer is a high molecular weight linear epoxy polymer sold under the trademark "ARALDITE" and obtainable from the CIBA Corporation of Summit, N.J., U.S.A. Other examples of epoxy materials which may be employed herein include polyhydroxy epoxy resins having a molecular weight of 200,000 or more such as EPONOL 55L32, trademark of Shell Oil Company, U.S.A. and bisphenol A-epichlorohydrin products as disclosed in U.S. Pat. Nos. 3,006,891 and 3,271,363. In addition other epoxy resins which may be employed include diglycidyl ether of bisphenol A (and its homologues), glycidyl ethers or glycerol, glycidyl ethers of bisphenol F, glycidyl ethers of a long chain bisphenol, glycidyl ethers of tetrakis (hydroxyphenyl) ethane, and epoxylated nonolacs. In addition, reference is made to the epoxy resins described and set forth in the publication *Epoxy Resins* by Henry Lee and Kris Neville, McGraw-Hill Book Co., Inc., (1957), which is incorporated herein by reference. The resinous materials may be dissolved to the extent of about 25% to about 50% of solids content in solvents such as methyl ethyl ketone, Cello-Solve acetate, methyl isobutyl ketone, Cello-Solve and the like. A particularly advantageous formulation includes a 32% solution of the resins in Cello-Solve acetate. Another advantageous mixture is 40% of the resin solids in methyl ethyl ketone.

The cross-linking agent, sometimes referred to as "blocking agent," is preferably a solution of from 40% to about 90% solids of a melamine resin such as an alkylated melamine-formaldehyde resin, preferably isobutylated melamine-formaldehyde resin (Cymel 255-10, trademark of American Cyanamid) or a methoxy methyl melamine resin, in a solvent such as a low molecular weight alcohol exemplified by isopropanol, isobutanol, or mixtures thereof. One such methoxy methyl melamine resin material is available under the trademark "UFORMITE" from Rohm & Hass Company of Philadelphia, Pa., U.S.A. Other cross-linking agents which may be employed include any known cross-linking agents which will cross-link the hydroxyls of the polyhydroxy epoxy resins mentioned above, and include aldehydes such as glyoxal, urea-formaldehyde and the like.

The epoxy plasticizers can be any available and known plasticizer for the particular epoxy resin employed. A preferred plasticizer is a diepoxide polypropylene glycol type flexible resin sold under the trademark "ARALDITE 508" (CIBA). Other plasticizers for the epoxy resin which may be employed herein include dimerized fatty acids such as EMPOL 1014, a trademark of Emery Corp., glycidyl esters of fatty acids, glycidyl esters of dimerized fatty acids and glycidyl ethers. Fatty acid ester type epoxy plasticizers such as SHELL 872 is particularly suitable as a plasticizer for the epoxy resin EPONOL 55L32 mentioned above.

The adhesion promoter can be any material which promotes adhesion to siliceous substrates, such as ceramic, glass, other silica-containing substrates, porcelain enamel, enameled steel as well as to thermoset acrylic-epoxy coatings and thermosetting plastics. Examples of suitable adhesion promotion materials are silane coupling agents, such as glycidoxy-propyl trimethoxy silane (Dow Corning Z-6040 silane), N-$\beta$-aminoethyl-$\alpha$-aminopropyl trimethoxy silane (Dow Corning Z-6020 silane), $\alpha$-mercaptopropyl trimethoxy silane and $\beta$-(3,4-epoxy cyclohexyl) ethyl trimethoxy silane.

The leveling or flow control agent can be any conventional flow control agent which aids in breaking bubbles in the lacquer layer and opaque layers as they are applied. Examples of such materials are dimethoxy silicones such as the General Electric material sold under the trademark "VISCASIL-60,000," dimethyl silicone polymer (350 centistokes) sold by General Electric under the name SF-96, a methyl phenyl silicone fluid (45–65 centistokes) sold by General Electric under the name SF-1023 and silicone resin in xylene (5–30 centipoise) sold by General Electric under the name SR-82.

It will be appreciated that the adhesion promoter is present in the lacquer and opaque layers where the decal is to be bonded to surfaces which may present an adherence problem, such as the siliceous and plastic substrates mentioned above. In other cases, adhesion promoters may or may not be present.

Mixtures of the epoxy resin and cross-linking agent amounts between about 95:5 to about 70:30 based on the solids content, are preferred for the lacquer layer.

The printing opaque, or contrast layer of the decal may be formulated in accordance with the above ranges of ingredients as to principal constituents and in addition, contains a minor amount of contrast material, such as from about 15% to about 35% by weight of a coloring agent as exemplified by titanium dioxide, metallic aluminum powder, and other inorganic opaque pigments, such as alumina hydrate, barium sulfate, calcium carbonate, chrome green, iron blues, lithopones, vermillion, white lead, magnesium carbonates, and metal oxides such as zirconium oxide, zinc oxide and the like. Organic pigments may be employed herein as well; however, the inorganic pigments are preferred in that they are more durable than the organic pigments. Organic pigments that are satisfactory for use herein may be chemically classified as the nitro, the azo and diazo, the nitroso and isonitroso, the oxyketone, the ketonimides and hydrazides, the triphenylamines, the azines, the quinolines, the acridine, the indanthrene and the phthalocyanine colors. Such pigments are added to give the desired opaque quality of the printing layer, and thus to furnish the desired contrast for printing the design layer thereon. In certain designs, of course, the opaque layer may become a part of the overall design itself and will not include epoxy and cross-linking agent.

It is to be understood, of course, that other well known lacquers or varnishes may be used as the vehicle for the opaque layer. For example, linseed varnishes, alkyd varnishes and the like may be used. One especially desirable vehicle for the pigment to form the opaque layer is a solution of cellulose acetate butyrate in a suitable solvent therefor, such as alcohols, toluenes, and the like. Plasticizer materials may also be added.

In one embodiment of the present invention, the design layer is formed of a composition comprising particulate pigment in admixture with the epoxy resin-containing formulation which comprises the lacquer layer. In such a design layer, the pigment will be present in an amount ranging from about 10% to about 40% and preferably from about 25% to about 35% by weight of the design layer and the epoxy resin-containing formulation (which optionally includes cross-linking agent, leveling agent, plasticizer and/or adhesion promoter) will be present in an amount ranging from about 90% to about 60% and preferably from about 75% to about 65% by weight of the design layer.

It will be understood that the pigment may be admixed with epoxy resin, cross-linking agent and any and all of the other ingredients comprising the lacquer layer, in the proportions employed in the lacquer layer.

The presence of the epoxy resin formulation with the pigment in the design layer enhances chemical and abrasion resistance of the design layer and enhances adhesion of the decalcomania to siliceous and other hard to adhere substrates.

Such a design layer comprising pigment particles and epoxy resin-containing formulation (employed in the lacquer layer) may be formed by conventional silk screening techniques.

The invention may be more clearly explained by referring to the following examples which represent preferred embodiments of the invention.

EXAMPLE I

A dextrin coated decal substrate paper, sold under the trade name "Thermaflat" obtained from Brittains Ltd., Cheddleton Paper Mills, Staffordshire, England, was used as the substrate for a "water slide-off" decalcomania.

An opaque background layer was deposited through a polyester 300 screen, using the standard silk screening techniques and then air-dried.

The background layer had the following formulation:

A. 760 parts by weight — 32% solids solution of a linear high molecular weight epoxy resin in Cellosolve acetate (ARALDITE 488 — CIBA Products, Summit, New Jersey, U.S.A.)
B. 40 parts by weight — 80% solid solution of a methoxy methyl melamine resin in a 1:1 mixture of isobutanol.
C. 200 parts by weight — Powdered titanium dioxide (Rutile 100 — Dupont, Wilmington, Delaware, U.S.A.)

The decal design was then laid down on the background layer using lithographic techniques. The inks which were used in the decal design were the standard alkyd type inks which are sold for heat resistant pigments. These inks are commercially available from, for example, the General Printing Ink Division of the Sun Chemical Corporation of East Rutherford, N.J., U.S.A.

When the decal design layer was completely air-dried, a lacquer layer was deposited thereover using the standard silk screening techniques and using a No. 60 polyester screen. The lacquer layer had the following composition:

A. 760 parts by weight — 32% solids solution of a linear high molecular weight epoxy resin in Cello-Solve acetate (ARALDITE 488 — CIBA Products, Summit, New Jersey, U.S.A.)
B. 40 parts by weight — 80% % solid solution of methoxy methyl melamine resin in a 1:1 mixture of isopropanol-isobutanol.

The lacquer layer was dried with warm air to result in the finished product.

The decal of Example I was placed in water until the dextrin had liquiified and then slid off onto an aluminum top cover which had been coated with an acrylic coating. The cover was then baked at a temperature of about 350° for 10 minutes and allowed to cool to room temperature.

The decorated cover was then subjected to boiling water for 4 hours and the decal was found to be in perfect condition after this rather harsh treatment.

After being subjected to this treatment the decal could not be removed from the cover with ordinary attrition techniques.

EXAMPLE II

The decal paper backing described above in connection with Example I, but in this instance coated with a thin film of polyethylene glycol having a molecular weight of about 20,000 instead of the dextrin layer, was used to prepare a heat releasable decal.

In this instance, there was deposited on the heat releasable substance (Carbowax 200 - commercially available from Union Carbide Corporation, 270 Park Avenue, New York, N.Y., U.S.A.) a lacquer layer. The layer was deposited using the standard silk screen techniques through a No. 60 polyester screen.

The lacquer deposited had the following formulation:

A. 760 parts by weight — 32% solid solution of a linear high molecular weight epoxy resin in Cello-Solve acetate (ARALDITE 488 — CIBA Products, Summit, New Jersey, U.S.A.)
B. 40 parts by weight — 80% solid solution of a methoxy methyl melamine resin in a 1:1 mixture of isopropanol-isobutanol.

The decal design was lithographically deposited on the lacquer layer using the same type of inks described in connection with Example I above.

An opaque contrast, or background layer, was then deposited on th lacquer layer using the same type of inks described in connection with Example I above.

An opaque contrast, or background layer, was then deposited over the design layer using the standard silk screening technique and a No. 30 polyester screen. The background layer had the following formulation:

B. 2.0 pounds cellulose acetate butyrate, 0.5 sec. (ASTM D-1343 54 T)
4.0 pounds diacetone alcohol
0.88 pounds Cello-Solve acetate
0.44 pound ethanol
0.44 pound toluene
0.40 pound dioctyl phthalate (plasticizer)

The cellulose acetate butyrate solids were dissolved in the mixture of solvents and the plasticizer added. Sufficient titanium dioxide was blended therewith to make a 20% blend thereof.

The decal prepared as described above was placed over a glass bottle which has been heated to about 270° F. and transferred smoothly thereto. The bottle was then heated to about 400° F. for approximately 15 minutes to cure and set the decal.

EXAMPLE III

Using the same type of substrate paper described in connection with Example I, that is, the water releasable substrate, a decal was prepared in which the opaque or contrast layer had the following formulation:

B. 2.0 pounds cellulose acetate butyrate, 0.5 sec. (ASTM D-1343 54 T)
4.0 pounds diacetone alcohol
0.88 pound Cello-Solve acetate
0.44 pound ethanol
0.44 pound toluene
0.40 pound dioctyl phthalate (plasticizer)

The cellulose acetate butyrate solids were dissolved in the mixture of solvents and the plasticizer added. Sufficient titanium dioxide was blended therewith to make a 20% blend thereof.

The design was printed on the dried contrast layer as described in connection with Example I, using the standard pigment formulations.

Using silk screening techniques, a lacquer layer was deposited upon the dried printed design layer which was a solution of cellulose acetate butyrate having the following formulation:

2.00 pounds cellulose acetate butyrate
4.00 pounds diacetone alcohol
0.88 pound Cello-Solve acetate
0.44 pound ethanol
0.44 pound toluene
0.40 pound dioctyl phthalate (plasticizer)

The resulting water slide-off decal was moistened in water and transferred to an aluminum metal dish, baked for 10 minutes at 350° F. and allowed to cool to room temperature. The resulting decal was firmly adhered to the bare aluminum surface. After 134 continuous cycles in an automatic dishwasher, the decal gave no evidence of any loss of color or deterioration of quality.

EXAMPLE IV

A water releasable decal was prepared by lithographically printing on the dextrine coating of the substrate paper a coating of an alkyd varnish containing 60% by weight of titanium dioxide.

A design layer was lithographically printed on the dried contrast layer as in connection with Examples above.

When the printed design had dried, a lacquer layer was deposited thereon by silk screening techniques. The lacquer layer was the admixture of epoxy-melamine resin used as the lacquer of Example I.

The water releasable decal was transferred to the surface of a glass bottle coated with a partially cured epoxy-acrylic resin and baked for 10 minutes at 350° F. The decorated bottle was then boiled for ½ hour in water, rubbed for 20 seconds with a cloth saturated with methyl ethyl ketone, and abraded with the fingernail without any deterioration whatsoever.

EXAMPLE V

A slide-off, or water releasable decal, was prepared using as the contrast layer the same material as was used for this layer on the decal of Example II. The printing layer was the same as any of the above, but the lacquer layer used in the decal of this example was the epoxy-melamine lacquer of Example I.

When transferred to an acrylic resin coated pan lid baked for 10 minutes at 400° F. the decal withstood boiling in water for 30 minutes without harm.

EXAMPLE VI

Using the substrate heat release paper of Example II and the same contrast and lacquer layers as was used in Example III, a heat release decal was prepared which, when transferred to a warmed glass bottle, baked for 15 minutes at 400° F. and cooled, withstood the boiling water test for 20 minutes without any visible deterioration.

EXAMPLE VII

In accordance with the procedure of Example I, a decal is formed employing as the lacquer layer the following formulation:

600 parts by weight — 32% solid solution of ARALDITE 488 (CIBA) in Cello-Solve acetate.
60 parts by weight — of a diepoxide polypropylene glycol type flexible resin (ARALDITE 508 — CIBA)
37 parts be weight — isobutylated melamine-formaldehyde resin (CYMEL 255-10 trademark of American Cyanamid) (50% solids in isobutanol)
2 parts by weight — glycidoxy-propyl-trimethoxy silane (DOW CORNING Z-6040 silane)
0.1 part by weight — of a dimethyl silicone (Viscasil-60,000 — trademark of General Electric)

The background opaque layer included the above lacquer layer formulation plus 200 parts by weight powdered titanium dioxide.

The decal thus formed is particularly adherent to siliceous substrates such as ceramics, glass, other silica containing materials, procelain enamel, enameled steel as well as to thermosetting acrylic-epoxy coatings and thermosetting plastics and is resistant to chemicals and abrasion, such as normally encountered in a machine dish-washing operation.

EXAMPLE VIII

A decal is formed as described in Example VII with the exception that the design layer is formed of titanium oxide pigment particles (30%) and the lacquer layer formulation of Example VII (70%). The design layer is laid down employing conventional silk screening techniques.

The resulting decal is particularly adherent to siliceous substrates, such as ceramics, glass, other silica-containing materials, porecelain enamel, enameled steel as well as to thermosetting acrylic-epoxy coatings and thermosetting plastics. The design layer of the decal has excellent chemical and abrasion resistance.

It is to be understood that the above description has been by way of example only and is not intended as a limitation to the scope of the invention.

What is claimed is:

1. A water-releasable decalcomania for decorating plastic coated objects, adapted to be affixed to the surface of said objects by a low temperature affixing operation, which comprises a substrate, a release coating deposited on said substrate, a contrast layer in contact with said release coating, said contrast layer comprising an opaque material, and a measured proportion of a thermosetting epoxy resin and a minor but cross-linking proportion of a cross-linking agent, a design layer imprinted on said contrast layer and a layer of a lacquer superimposed over said design layer, said lacquer layer consisting essentially of a measured proportion of a thermosetting epoxy resin and minor but cross-linking proportion of a cross-linking agent.

2. A decalcomania according to claim 1, wherein said opaque material is titanium dioxide.

3. A decalcomania according to claim 1, wherein said releasable coating is starch, dextrins, or water soluble gums.

4. A decalcomania according to claim 1, wherein said cross-linking resin is an alkylated melamine-formaldehyde resin or a methoxy methyl melamine resin.

5. A decalcomania according to claim 1, wherein said contrast layer comprises from about 90% to about 70% by weight based on the solids content of a high molecular weight linear epoxy resin and from about 10% to about 30% by weight, based on the solids, of an isobutylated melamine-formaldehyde resin.

6. A decalcomania according to claim 1, wherein the lacquer layer includes, in addition, from about 0.1% to about 3% by weight of an adhesion promoter.

7. A decalcomania according to claim 6, wherein the adhesion promoter is a silane coupling agent.

8. A decalcomania according to claim 1, wherein the lacquer layer includes, in addition, from about 3% to about 16% by weight of an epoxy plasticizer, and from about 0.01% to about 0.3% by weight of a leveling agent.

9. A decalcomania according to claim 8, wherein the epoxy plasticizer is a diepoxide polypropylene glycol type flexible resin and the leveling agent is a dimethyl silicone.

10. A decalcomania according to claim 8, wherein the lacquer layer includes, in addition, from about 0.1 to about 3% by weight of an adhesion promoter.

11. A decalcomania according to claim 1, wherein the design layer comprises particles of pigment, and a lacquer layer formulation comprising a polyhydroxy epoxy resin having a molecular weight ranging from about 15,000 to about 300,000, cross-linking agent, an epoxy plasticizer, and adhesion promoter and a leveling agent.

12. A water-releasable decalcomania for decorating plastic coated objects, adapted to be affixed to the surface of said objects by a low temperature affixing operation, which comprises a substrate, a release coating deposited on said substrate, a contrast layer in contact with said release coating, said contrast layer comprising an opaque material and a measured proportion of a thermosetting epoxy resin and a minor but cross-linking proportion of a cross-linking agent, a design layer imprinted on said contrast layer thereon, and a layer of a lacquer superimposed over said design layer, said lacquer layer consisting essentially of a measured proportion of a thermosetting epoxy resin and a minor but cross-linking porportion of a cross linking agent, said thermosetting epoxy resins in said contrast layer and said lacquer layer comprising a high molecular weight linear polyhydroxy epoxy polymer having a molecular weight within the range of from about 15,000 to about 300,000.

13. A heat releasable decalcomania for decorating plastic coated objects, adapted to be affixed to the surface of said objects by a low temperature affixing operation, which comprises a substrate, a release coating deposited on said substrate, a contrast layer comprising an opaque material, and a measured proportion of a thermosetting epoxy resin and a minor but cross-linking proportion of a cross-linking agent, a design layer imprinted on said contrast layer, and a layer of a lacquer superimposed over said design layer, said lacquer layer consisting essentially of a measured proportion of a thermosetting epoxy resin and minor but cross-linking proportion of a crosslinking agent, said substrate layer being in contact with said lacquer layer through said release coating.

14. A decalcomania according to claim 13 wherein said opaque material is titanium dioxide.

15. A decalcomania according to claim 13 wherein said releasable coating is a mixture of polyethylene glycols of high molecular weight.

16. A decalcomania according to claim 13 wherein said cross-linking resin is an alkylated melamine-formaldehyde resin or a methoxy methyl melamine resin.

17. A decalcomania according to claim 13 wherein said contrast layer comprises from about 90% to about 70% by weight based on the solids content of a high molecular weight linear epoxy resin and from about 10% to about 30% by weight, based on the solids, of an isobutylated melamine-formaldehyde resin.

18. A decalcomania according to claim 13 wherein said contrast layer and said lacquer layer each comprise a mixture of an epoxy resin and a cross-linking agent.

19. A decalcomania according to claim 13 wherein said lacquer layer includes, in addition, from about 0.1% to about 3% by weight of an adhesion promoter.

20. A decalcomania according to claim 19 wherein the adhesion promoter is a silane coupling agent.

21. A decalcomania according to claim 13 wherein the lacquer layer includes, in addition, from about 3% to about 16% by weight of an epoxy plasticizer, and from about 0.01% to about 0.3% by weight of a leveling agent.

22. A decalcomania according to claim 21 wherein the epoxy plasticizer is a diepoxide polypropylene glycol type flexible resin and the leveling agent is a dimethyl silicone.

23. A decalomania according to claim 22 wherein the lacquer layer includes, in addition, from about 0.1 to about 3% by weight of an adhesion promoter.

24. A decalcomania according to claim 13 wherein the design layer comprises particles of pigment, and a lacquer layer formulation comprising a polyhydroxy epoxy resin having a molecular weight ranging from about 15,000 to about 300,000, cross-linking agent, an epoxy plasticizer, adhesion promoter and a leveling agent.

25. A heat release decalcomania for decorating plastic coated objects, adapted to be affixed to the surface of said objects by a low temperature affixing operation, which comprises a substrate, a release coating deposited on said substrate, a contrast layer comprising an opaque material and a measured proportion of a thermosetting epoxy resin and a minor but cross-linking proportion of a cross linking agent, a design layer imprinted on said contrast, layer and a layer of a lacquer superimposed over said design layer, said lacquer layer consisting essentially of a measured proportion of a thermosetting epoxy resin and a minor but cross-linking proportion of a cross-linking agent, said thermosetting epoxy resin in said contrast layer and said lacquer layer comprising a high molecular weight linear polyhydroxy epoxy polymer having a molecular weight within the range of from about 15,000 to about 300,000, said substrate layer being in contact with said lacquer layer through said release coating.

* * * * *